United States Patent
Tognazzini

(12) 
(10) Patent No.: US 6,496,841 B1
(45) Date of Patent: Dec. 17, 2002

(54) TECHNIQUES FOR IDENTIFYING AND MANIPULATING QUOTED OR REPRODUCED MATERIAL USING A QUOTE BAR

(75) Inventor: Bruce Tognazzini, Woodside, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 873 days.

(21) Appl. No.: 08/670,904

(22) Filed: Jun. 26, 1996

(51) Int. Cl.[7] .............................................. G06F 17/21
(52) U.S. Cl. ...................... 707/512; 345/808; 345/809; 707/513; 707/537; 707/539
(58) Field of Search ................................. 395/791, 793, 395/346, 347, 349; 707/501, 539, 512, 537, 513; 345/347, 336, 346, 349, 808, 809

(56) References Cited

U.S. PATENT DOCUMENTS

| | | | | |
|---|---|---|---|---|
| 5,097,418 A | | 3/1992 | Nurse et al. ................. 707/537 |
| 5,146,552 A | | 9/1992 | Cassorla et al. ............ 707/512 |
| 5,280,574 A | * | 1/1994 | Mizuta et al. .............. 707/511 |
| 5,418,908 A | * | 5/1995 | Keller et al. ................ 709/206 |
| 5,546,521 A | * | 8/1996 | Martinez ..................... 345/711 |
| 5,559,942 A | * | 9/1996 | Gough et al. ............... 345/802 |
| 5,603,025 A | * | 2/1997 | Tabb et al. ..................... 707/2 |
| 5,659,729 A | * | 8/1997 | Nielsen .......................... 707/3 |
| 5,717,917 A | * | 2/1998 | Munakata ...................... 707/8 |

FOREIGN PATENT DOCUMENTS

EP        0 464 306 A2      1/1992

OTHER PUBLICATIONS

IBM Technical Disclosure Bulletin, vol. 30, No. 6, Nov. 1, 1987, "Technique for Displaying the Hierarchical Structure of a Document", pp. 340–342.

Coombs, J H et al., Communications of the Association for Computing Machinery, vol. 30, No. 11, Nov. 1987, "Markup Systems and the Future of Scholarly Text Processing", pp. 933–947.

* cited by examiner

*Primary Examiner*—Kenneth S. Kim
(74) *Attorney, Agent, or Firm*—McDermott, Will & Emery

(57) ABSTRACT

The handling of quoted material in an electronic environment is enhanced by using one or more quote bars. Quote bars permit quoted material to be treated as a single object and permit information about the source of a quote to be displayed. They also permit connection to a network address from which a quote may have originated. Using quote bars, the removal of copyright notices can be prevented.

17 Claims, 17 Drawing Sheets

240 From: Lynn
To: Bert
Subject: Request for John's Photo

Bert:

I have forwarded your emails to John's home account and he will reply to you ASAP.
I will send you a photo today
via interoffice mail.

Lynn

200 > From: Bert
> To: Lynn
205 > Subject: RE: Speaking Opportunity
> Date: May 5, 1996
>
> Lynn.
>
> Can you confirm that you are the right person to talk to about this matter?
>
> Bert
>
210 > > From: Bert
> > To: Lynn
215 > > Subject: RE: Speaking Opportunity
> > Date: May 1, 1996
> >
> > Lynn.
> >
> > I really need a photo of John. the title of his talk. and a few lines describing the content.
> >
> > Bert
> >
220 > > > From: Bert
> > > To: John
225 > > > Subject: RE: Speaking Opportunity
> > > Date: April 28, 1996
> > >
230 > > > > I will be happy to give the talk.
> > > >
> > > > John
> > > >
> > > Great News!!
> > > Bert

Figure 2 (PRIOR ART)

300   From: Lynn
      To: Bert
      Subject: Request for John's Photo

Bert:

I have forwarded your emails to John's home account and he will reply to you ASAP.
      I will send you a photo today
      via interoffice mail.

— 310
      Lynn.

Can you confirm that you are the right person to talk to about this matter?

Bert

— 320
      Lynn.

I really need a photo of John. the title of his talk. and a few lines describing the content.

Bert    330

John: 340

Bert:

I will be happy to give the talk.

John

Great News!!
      Bert

Figure 3 (PRIOR ART)

1400- <QUOTE
1401---------<SOURCE from john doe
            to: mary smith
            subject: meeting next week
1404---------/SOURCE>
1406---------<CONTENT the quick brown fox jumps over the lazy dog.
            A stitch in timme saves nine
1407----------------------<NODELETE ask not what your country can do for you,
            but what you can do for your country /NODELETE>
1408---------/CONTENT>
1410---------<BAR_REMOVABLE = false /BAR_REMOVABLE>

1412---------<QUOTE
            <SOURCE from: mary smith
                to: john doe
                date: May 11, 1996
            /SOURCE>
            <CONTENT jack and jill went up the hill
            /CONTENT>
1414--------------- <BAR_REMOVABLE = true BAR_REMOVABLE>
1416------------/QUOTE>
1418- QUOTE>

Figure 14

1502 ------ > from: john doe
         > to: mary smith
         > subject: meeting next week
         > the quick brown fox jumps over the lazy dog.
         > A stitch in time saves nine
         > ask not what your country can do for you, but what you can do for
1504 ------ > your country
1506 ------ > > from: mary smith
         > > to: john doe
         > > date: May 11, 1996
1508 ------ > > jack and jill went up the hill

Figure 15

TECHNIQUES FOR IDENTIFYING AND MANIPULATING QUOTED OR REPRODUCED MATERIAL USING A QUOTE BAR

BACKGROUND OF THE INVENTION

1. Field of the Invention

The invention relates to the presentation of electronic text and, more particularly, to the use of quote bars which can be activated to display information about the origin of the text and about its copyright status.

2. Description of Related Art

The digital transfer of information between individuals, whether by electronic mail, the World Wide Web, or other Internet services such as File Transfer Protocol (FTP), can easily lead to confusion about the original author of such material. The problem is especially acute when individuals use the cut and paste functionality of text editors to selectively copy portions of a second document into their own. Although one individual may be careful to give credit where credit is due, others may not. Even when explicit credit is given to the original author, such as in a footnote, it may be hard to discern that credit has been given while reading the document on a computer.

Electronic mail is one area where this problem is clearly demonstrable. When text from an earlier electronic mail message is copied by a user of current electronic mail systems, the fact that it has been copied is indicated to the recipient in one of three ways. Dashed lines above and below the quoted material, with an appropriate caption is one method. Another is to place greater than (">") sign at the left of each line of quoted text. Finally, some systems provide no automatic means to indicate quoted material, relying solely upon the user to insert a caption indicating the original source.

A problem encountered by recipients of electronic mail containing quoted material indicated by the dashed-line method noted above, when reading a quote that occupies more than one screen, is that the recipient often no longer is able to see the dotted lines due to the length of the quoted material.

Difficulties also exist with electronic mail that has used the greater than symbol (">") quotation method. If the recipient wishes to quote the material in a more standard way, by using quotation marks or indentation, he is faced with the task of removing each ">" from each line, a process that can be especially tedious if the text editor employed does not support global search and replace functions. Although the ">" method does provide a consistent way of quoting material and does reveal the source of the quotation it does so in a way that is clumsy and confusing.

Additionally, none of the quotation methods provide a way for the user to access the source of the original material. For example, a quotation taken from a document published on the World Wide Web may indicate the author and title of the document, but it rarely indicates the Universal Resource Locator (URL) that the user would need to view the source document.

The use of Standard Generalized Markup Language (SGML) and its subset Hypertext Markup Language (HTML) is well known. The standards allow software enabled readers and browsers to format and display a document in the same way, regardless of the computing device being used. Standards such as SGML and HTML allow for device and operating system independence which is critical in the heterogeneous environment of the Internet. The use of SGML and HTML is widespread, well-understood and the standards are validated, maintained and extended by formally constituted bodies of individuals from government, industry and academia.

Readers and browsers are known which recognize a particular file format and activate the appropriate software module to view the file. This technology allows a single reader or browser to display a wide variety of files, such as graphic images, hypertext documents, and ASCII text, within the same user interface in a way that is transparent to the user.

SUMMARY OF THE INVENTION

The present invention provides apparatus, systems, processes and computer program products which will allow individuals to both easily quote textual information and to easily view the citation and source of quoted textual material they receive. Additionally, the system provides techniques to ensure that the citation for quoted material cannot be removed and for providing the user access to the original source of the material in a convenient and standard way.

Instead of using the prior art methods of quotation, the present system employs "quote-bars". Quote-bars have distinct advantages over the prior art in that they provide a unique and superior method of identifying quoted text. Instead of columns of individual ">"s, a quote-bar is a single object. As an object, quote-bars respond to events initiated by the user in a standard way. Selecting the quote-bar, via a pointing device or keyboard of a computing device, allows the user to manipulate the quote-bar and the text associated with it in a manner familiar to users of graphical user interfaces. Additionally, if the quote-bar is selected in a manner equivalent to the commonly used double-click, then the source of the quoted material is displayed in a dialog box for the user's inspection.

Quote-bars may be created by the user when manually entering text. Such a quote-bar may be made to be persistent; that is, the quote-bar cannot be removed without removing the associated text. The text that is controlled by the quote-bar can also have attributes that prevent the entire quote or a portion of it from being changed or modified by subsequent users.

Quote-bars may also contain, depending upon the source of the textual material, hypertext links to the source of the material, which may be the electronic mail address of the sender or author, the URL of the original document, or the FTP site from which the original document may be accessed.

The present system also allows for the conversion of the prior art's quotation format into quote-bars for documents that are received by the user and the conversion of quote-bar information into the prior art's format for transmission to readers or browsers that do not support quote-bars.

The invention relates to apparatus for displaying text information including a display, a keyboard, and a computer, connected to the keyboard and the display. The computer is configured to display quoted or derived text material as an object including a quote bar. The apparatus can be implemented, inter alia, as a browser, a text editor or an e-mail editor. A mouse can be used to displays information about a source of the quoted or derived text material by clicking on the quote bar. The quoted or derived text material can be repositioned using the mouse to drag and drop the quote bar to a different location.

Information about the quoted or derived text material can be displayed using the mouse to click on the quote bar. That information can include information about origin of the text material, a network address where the text material originated or information about the copyright status of the quoted or derived text material.

The invention is also directed to a method of displaying information about a source of quoted or derived text material by associating the text material with a quote bar, and associating the information about a source with the quote bar so that when the quote bar is selected, the information about the source is displayed. Separation or deletion of the copyright information from the text material can be prevented.

The invention is also directed to a method of converting a document containing embedded quote bar information into a document displayable by a reader unequipped to handle quote bar information, by, for each line of text marked as encompassed by a quote bar, prefacing the line with an one or more ASCII characters.

The invention is also directed to a method of converting a document containing an ASCII character representing a quoted or derived information into a quote bar representation of that quoted or derived information, by, for each consecutive line of text marked with the same number of the one or more ASCII characters, replacing at least one of the ASCII characters with a quote bar.

The invention is also directed to a system for communicating textual information, including a network and a plurality of computers connected to the network, at least one of the computers configured to group quoted or derived information together with a quote bar.

The invention also relates to computer program products implementing these techniques.

The novel features of this invention solve important problems with the creation and manipulation of quoted text, whether that text is contained within electronic mail or is a stand-alone document available for electronic retrieval. User are presented with a simple and intuitive method for manipulating quoted text and viewing its source. Creators of text are provided with additional protection by ensuring that whenever that text is copied, the source information about the text is also copied.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The object, features and advantages of the system of the present invention will be apparent from the following descriptions, in which:

FIG. 2 illustrates a prior art method of dealing with quoted material in the context of electronic mail.

FIG. 3 illustrates an example of the content of FIG. 2 implemented as quote-bars.

FIG. 14 is an illustration of an implementation of quote-bar syntax that would be used to transfer quote-bar documents from one enabled browser to another.

FIG. 15 is an illustration of the output of the conversion process from quote-bar text to ASCII text.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
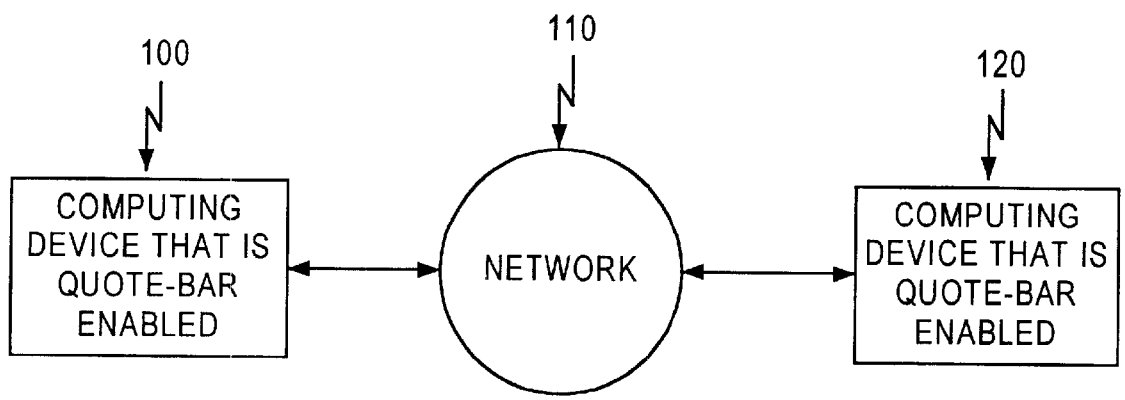
FIG. 1 is an illustration of the preferred environment within which the quote-bar system will operate in accordance with the invention.

FIG. 1 is an illustration of the preferred environment within which the quote-bar system will operate in accordance with the invention. A computing device that is quote-bar enabled (100) sends or receives quoted material, via a network (110), from a similarly enabled computing device (110).

FIG. 2 illustrates a prior art method of dealing with quoted material in the context of electronic mail. For illustrative purposes only, the ">" method of indicating quotations is used throughout the discussion of the preferred embodiment to help illustrate the advantages of the preferred embodiment. However, any similar scheme could have been used. The electronic mail message (240) contains four quotations which are indicated by the use of ">"s. The number of ">"s on a particular line identifies from which previous message the text is quoted. The first quoted message begins at (200) and the source of the quotation is contained in the lines indicated by (205). Similarly, each line of the nested quotes contained within the first quote are preceded by a number of ">"s, indicating the degree of nesting. The first nested quote begins at (210) and its source information is contained within the lines indicated by (215). The second nested quote begins at (220) and its source information is contained within the lines indicated by (225). The final nested quote begins at (230) and does not contain any source information.

Figure 8:
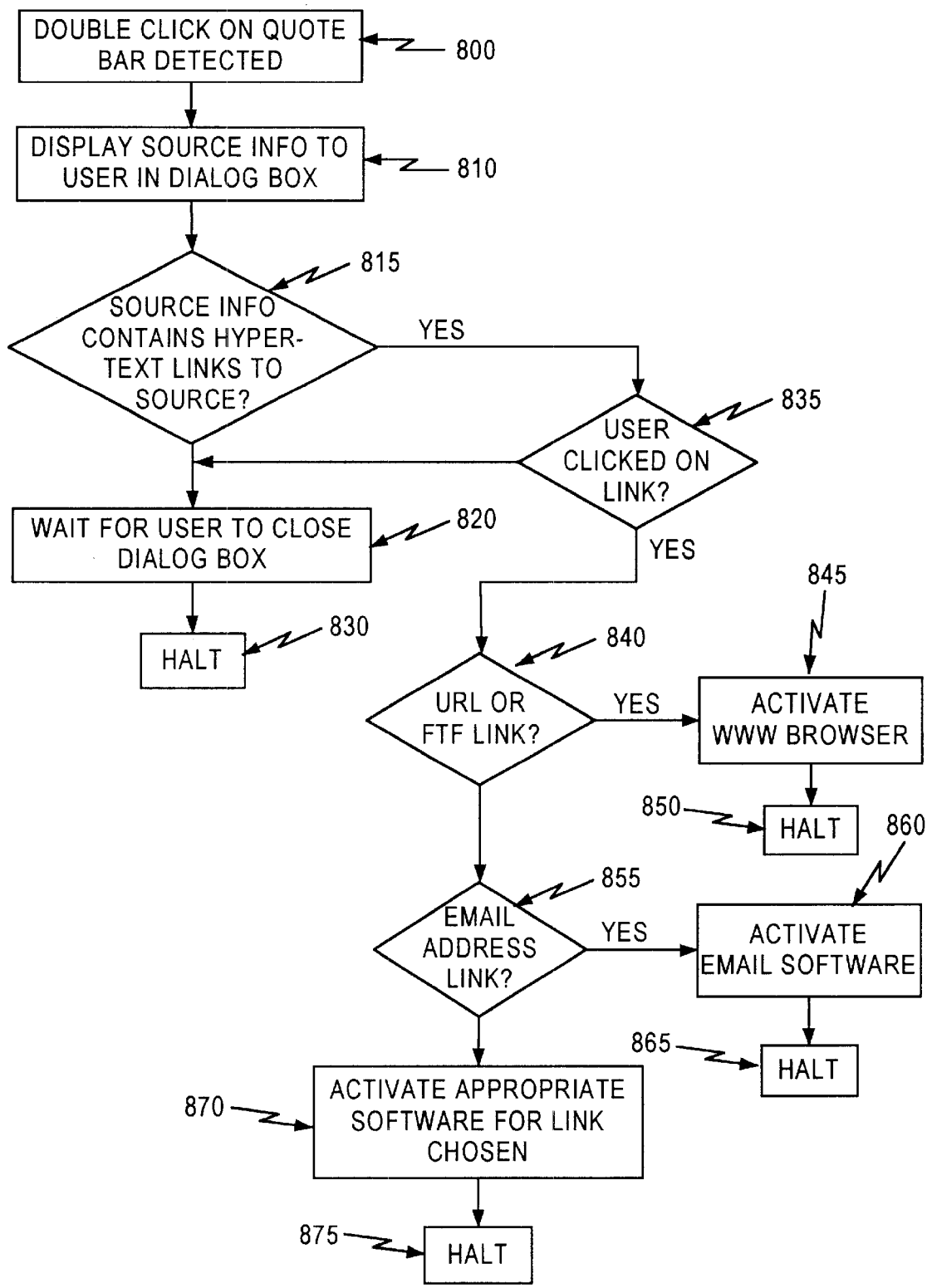
FIG. 8 is a flow chart of a process for handling the double-click event of a quote-bar.

FIG. 3 illustrates an example of the content of FIG. 2 implemented as quote-bars. The electronic mail message of FIG. 2 has been transformed into the preferred embodiment using quote-bars. The mail message (300) retains its normal structure for the un-quoted material between (300) and (310) as that text is original and thus not quoted. The first quote-bar (310) is a single object with a length equal to that of the entire message from (310) as there are nested or embedded quotes. The source information has been removed from the display and, as will be shown in FIG. 8, is available on demand by the user. A second quote-bar begins at (320) and also has a length equal to the entire message from (320) as it also contains nested quotes. The quote-bar at (330) was created in a similar fashion to those at (310) and (320). The innermost quote-bar at (340) does not have a length from (340) to the end of the message because the quotation (and quote-bar) beginning at (340) is wholly contained with the quote-bar beginning at (330).

Figure 4:
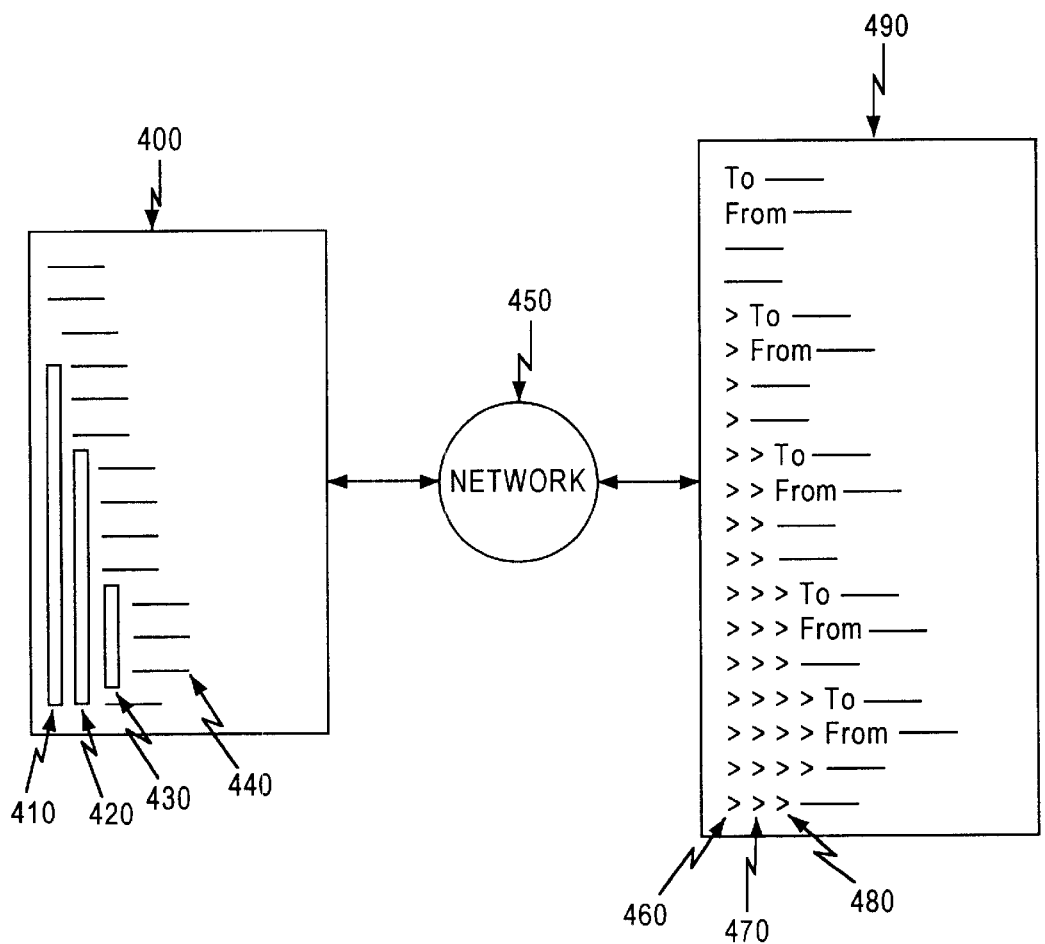
FIG. 4 illustrates the exchange of quoted text between quote-bar enabled computing devices and those that are not enabled.

FIG. 4 illustrates the exchange of quoted text between quote-bar enabled computing devices and those that are not enabled.

The quote-bar enabled device (400) displays a document that utilizes quote-bars (410, 420, 430, and 440). When transmitted, via a network (450), to a device that does not support quote-bars (490), the system converts the quote-bar document into the prior art's format, indicated by (460, 470, and 480).

Figure 5:
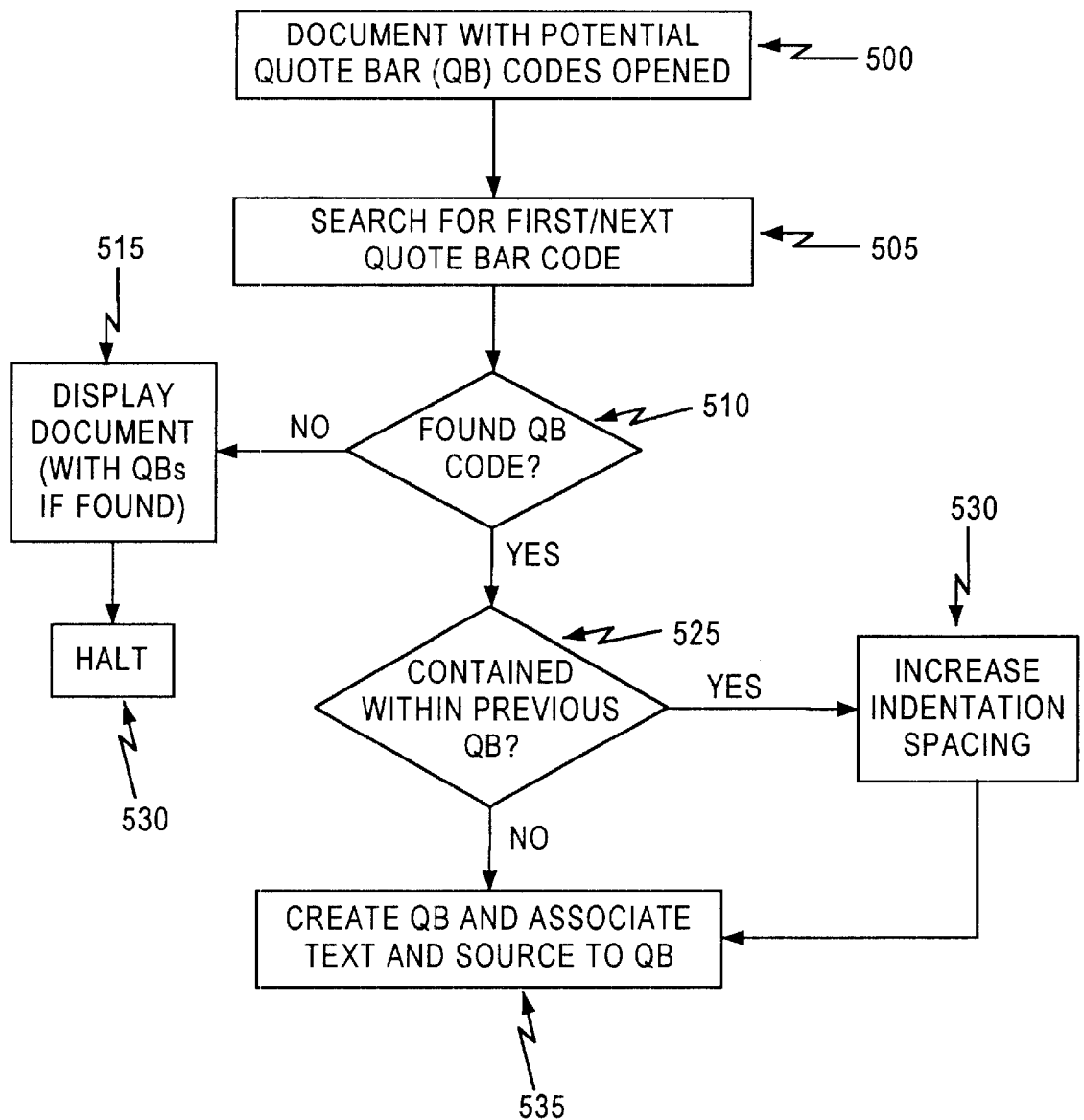
FIG. 5 is a flow chart of a process for interpreting the quote-bar syntax by quote-bar enabled devices for display to the user.

FIG. 5 is a flow chart of a process for interpreting the quote-bar syntax by quote-bar enabled devices for display to the user. A document is opened by a reader or browser that can interpret the quote-bar syntax (shown in FIG. 15) contained within the document (500). The enabled software searches the document for the first quote-bar code (505). If a quote-bar code is found (510) then, if the quote-bar code was nested within a previous quote-bar code (525) then the software records the fact that the indentation (530) of the quote-bar will be increased. The quote-bar is then created by the software (535) by creating the quote-bar object, and placing in that object's data structure relevant information about where the quote-bar is to be displayed, the source of the quote, and the text associated with the quote-bar. The process then begins again at (505) by searching for more quote-bar codes within the document. When no more quote-bar codes are found (510), the software then displays the document with quote-bars (if any were found) (515) and then the process is terminated (520).

Figure 6:
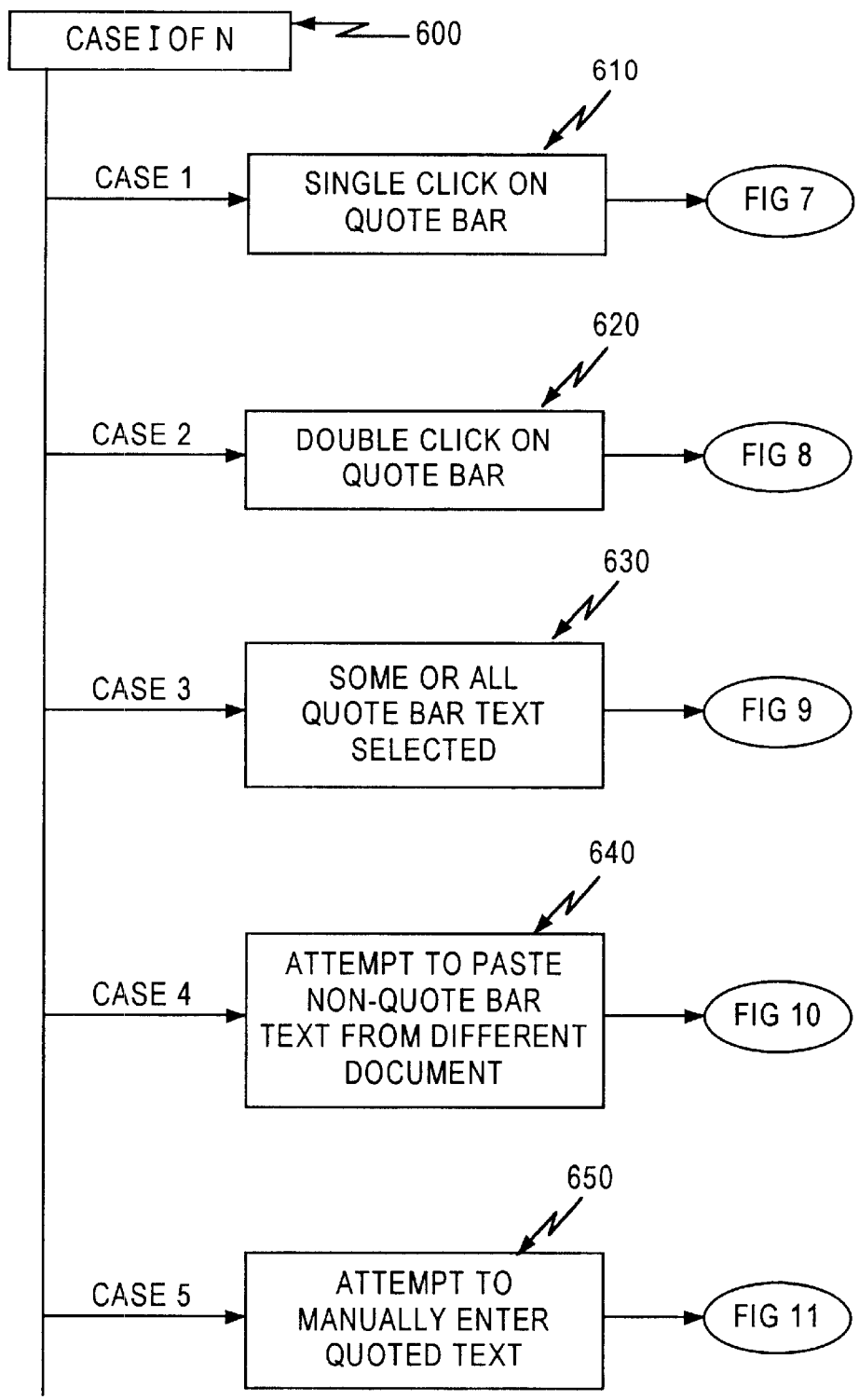
FIG. 6 is a flow chart of the various events that a user may trigger when using quote-bars.

FIG. 6 is a flow chart of the various events that a user may trigger when using quote-bars. Since the quote-bar is an object within the document the user is able to initiate events by manipulating the quote-bar object. There are at least five events that can occur (600). A single click on the quote-bar (610) is an event that initiates a process described in FIG. 7. A double click on the quote-bar (620) is an event that initiates a process described in FIG. 8. The selection of some or all of the text associated with the quote-bar (630) is an event that initiates a process described in FIG. 9. An attempt to paste text from a different document that does not have quote-bars (640) is an event that initiates a process described in FIG. 10. An attempt to manually enter quoted text (650) is an event that initiates a process described in FIG. 11.

Figure 7:
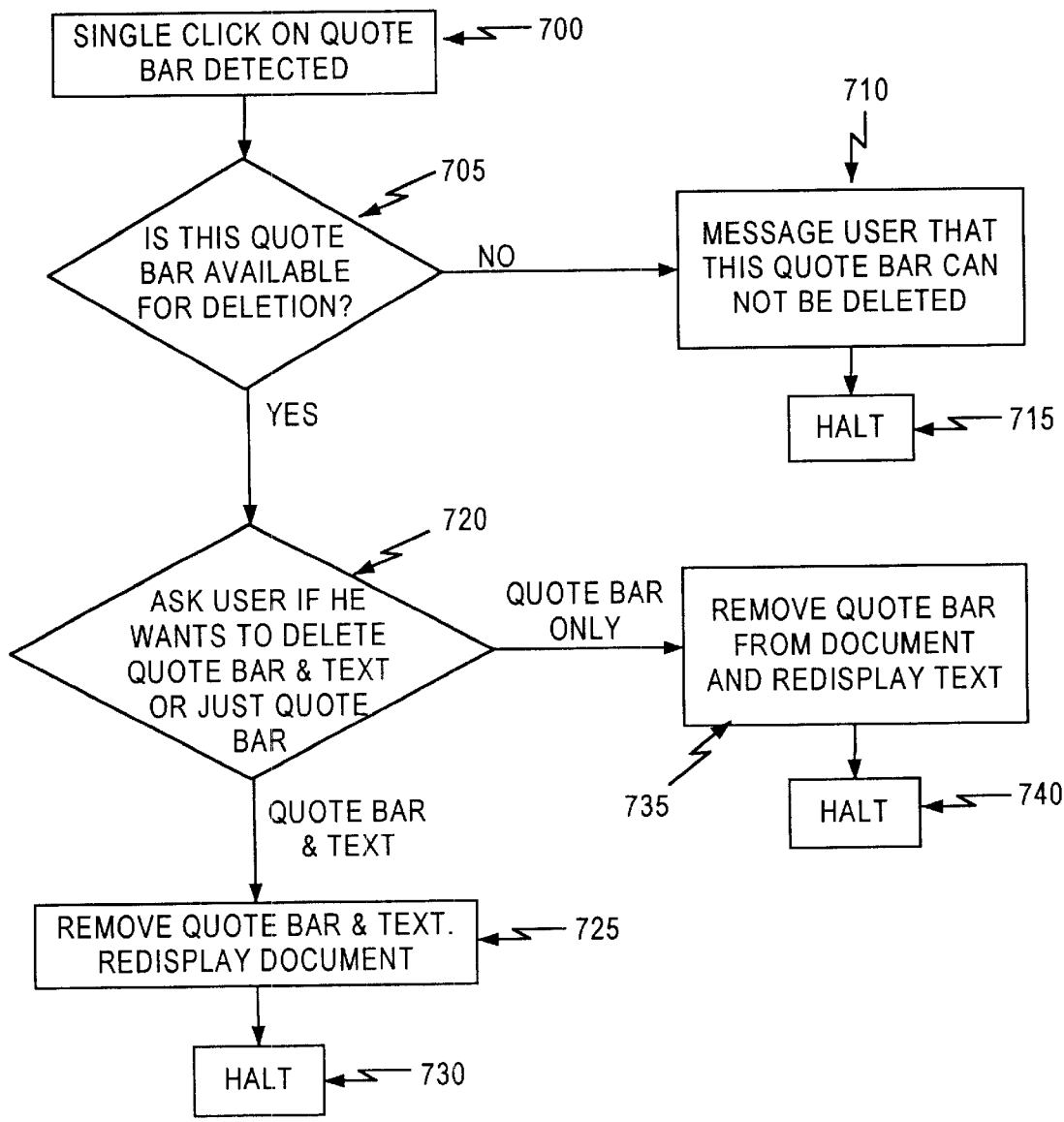
FIG. 7 is a flow chart of a process for handling the single-click event of a quote-bar.

FIG. 7 is a flow chart of a process for handling the single-click event of a quote-bar. When such an event is detected at (700) the software selects the quote-bar object by highlighting it, using the prior art for dealing with selected objects. Additionally, the prior art is employed for operations such as cutting and pasting the object or dragging it to a new location. If, however, the user indicates that he wishes to delete the quote-bar object, then the software determines from the object's data structure whether such an operation is allowable (705). If it is not allowable (705), then a message is displayed to the user notifying him of this fact (710) and the process is terminated (715). If the quote-bar and source are available for deletion (705) the user is then asked whether he wants to delete the quote-bar and the source only or the entire quote-bar object including the text (720). If the user wants to delete the entire object (720) then the object is removed from the document and the document is re-displayed without the quote-bar and the text and the process is terminated (730). If, on the other hand, the user just wants to remove the quote-bar and the source information (720) then that operation is performed and the document is then re-displayed (735) prior to the process being terminated (740).

FIG. 8 is a flow chart of a process for handling the double-click event of a quote-bar. The double click event, when detected by the software (805), causes the software to display the quote-bar source information in a dialog box to the user (810). If the source box does not contain hypertext links to the actual source of the quoted text (815) then the user views the source information, closes the dialog box (820) and the process is terminated (830). If, however, the source dialog box contains hypertext links (845) and the user has selected one of those links (835), then the software attempts to launch the correct application to connect to those links. If the link is to a URL or FTP site (840) then the software would activate a WWW browser (845) and provide the browser with the URL link and the process would terminate (850). If the link is an electronic mail address (855) the software would activate an electronic mail program (860) and the process would then terminate (865). If the link is of a different sort from those above, the software would attempt to activate the appropriate software (870) and the process would terminate (875).

Figure 9:
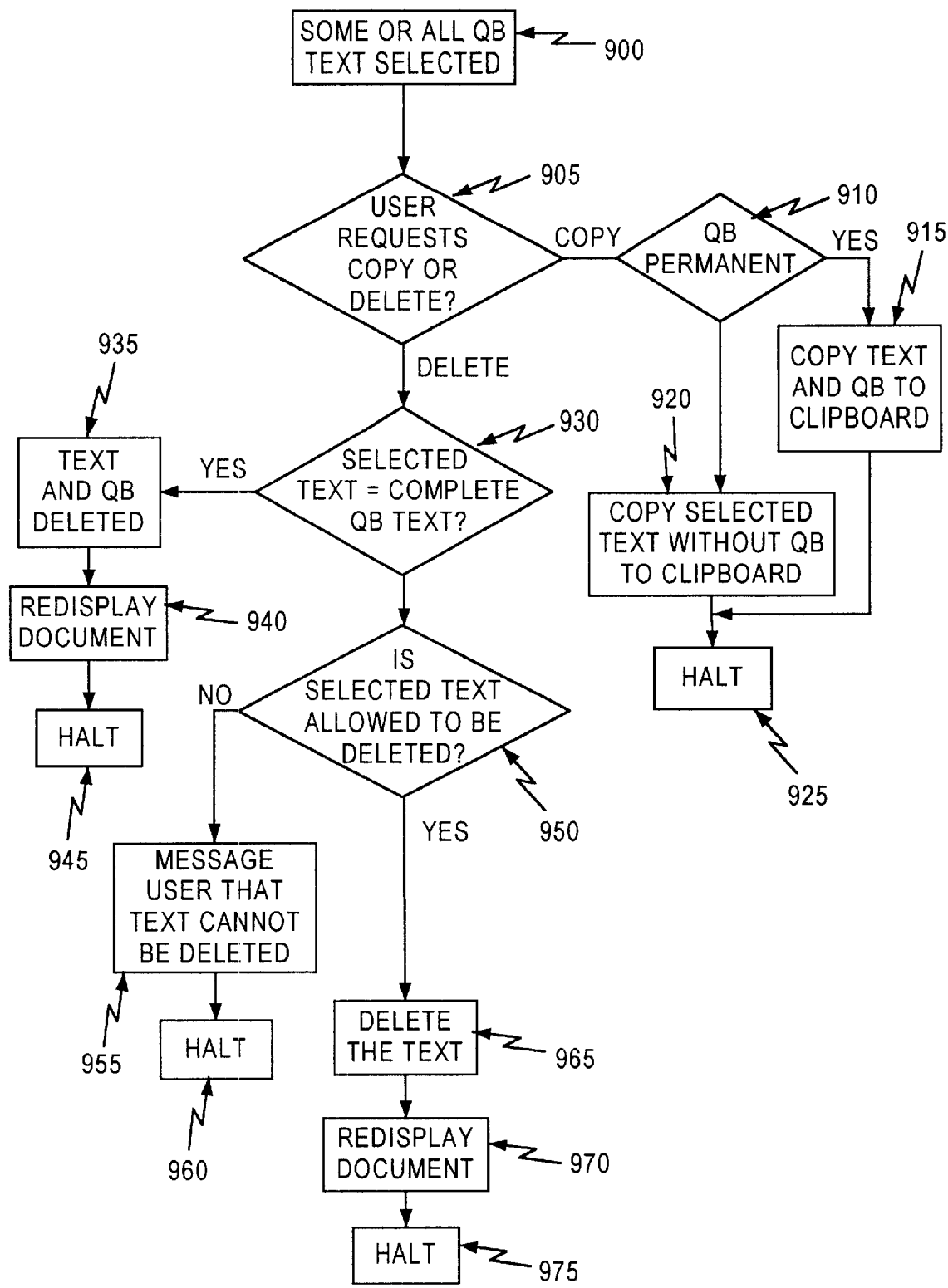
FIG. 9 is a flow chart of a process for handling the selection of quoted text controlled by a quote-bar.

FIG. 9 is a flow chart of a process for handling the selection of quoted text controlled by a quote-bar. The user selects some or all of the text belonging to the quote-bar object (900). If the user requests to copy the selected text (905) then, if the quote-bar object's data indicates that the quote-bar is permanent or persistent (910), the selected text, quote-bar and source information are copied to the software's internal clipboard (915), and the process is terminated (925). If, however, the quote-bar is not required to be permanent or persistent, the selected text is copied to the software's internal clipboard (920) without the quote-bar or the source information and the process is terminated (925).

Should the user request to delete the selected text (905) and if the user has selected all of the text associated with the quote-bar (930) then the text, quote-bar and source information are deleted (935), the document is then re-displayed (940) and the process is terminated (945). Alternatively, if the selected text is only a portion of the text associated with the quote-bar and that text is not allowed to be deleted (950), then a message is displayed to the user advising him that the selected text cannot be deleted (955) and the process is terminated (960). If, however, the selected text is permitted to be deleted then the text is deleted (965), the document is re-displayed and the process is terminated (975).

Figure 10:
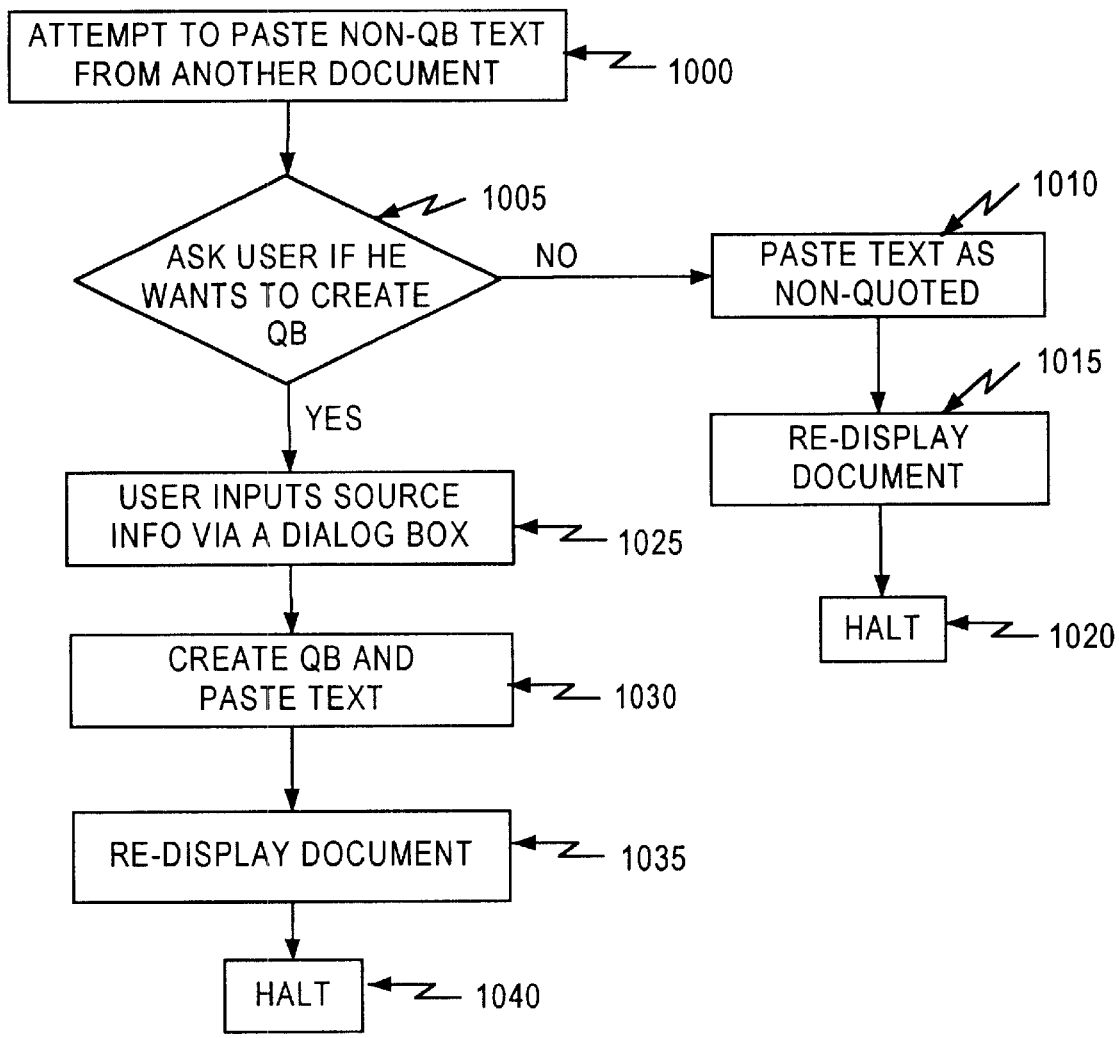
FIG. 10 is a flow chart of a process for copying text from a document that does not have an associated quote-bar.

FIG. 10 is a flow chart of a process for copying text from a document that does not have an associated quote-bar. If the user has placed text from another document on the software's internal clipboard and he attempts to paste it into the current document (1000) then the user is asked if he desires to create a quote-bar for the clipboard text (1005). If the user does not wish to create a quote-bar (1005) then the clipboard text is pasted into the current document using the prior art (1010), the document is re-displayed (1015) and the process is terminated (1020). If the user does wish to create a quote-bar for the clipboard text (1005) then a dialog box is displayed to allow the user to enter the source information and other relevant data about the text he wishes to paste (1025). The quote-bar is then created and the text pasted into the document (1030). The document is then re-displayed (1035) and the process is terminated (1040).

Figure 11:
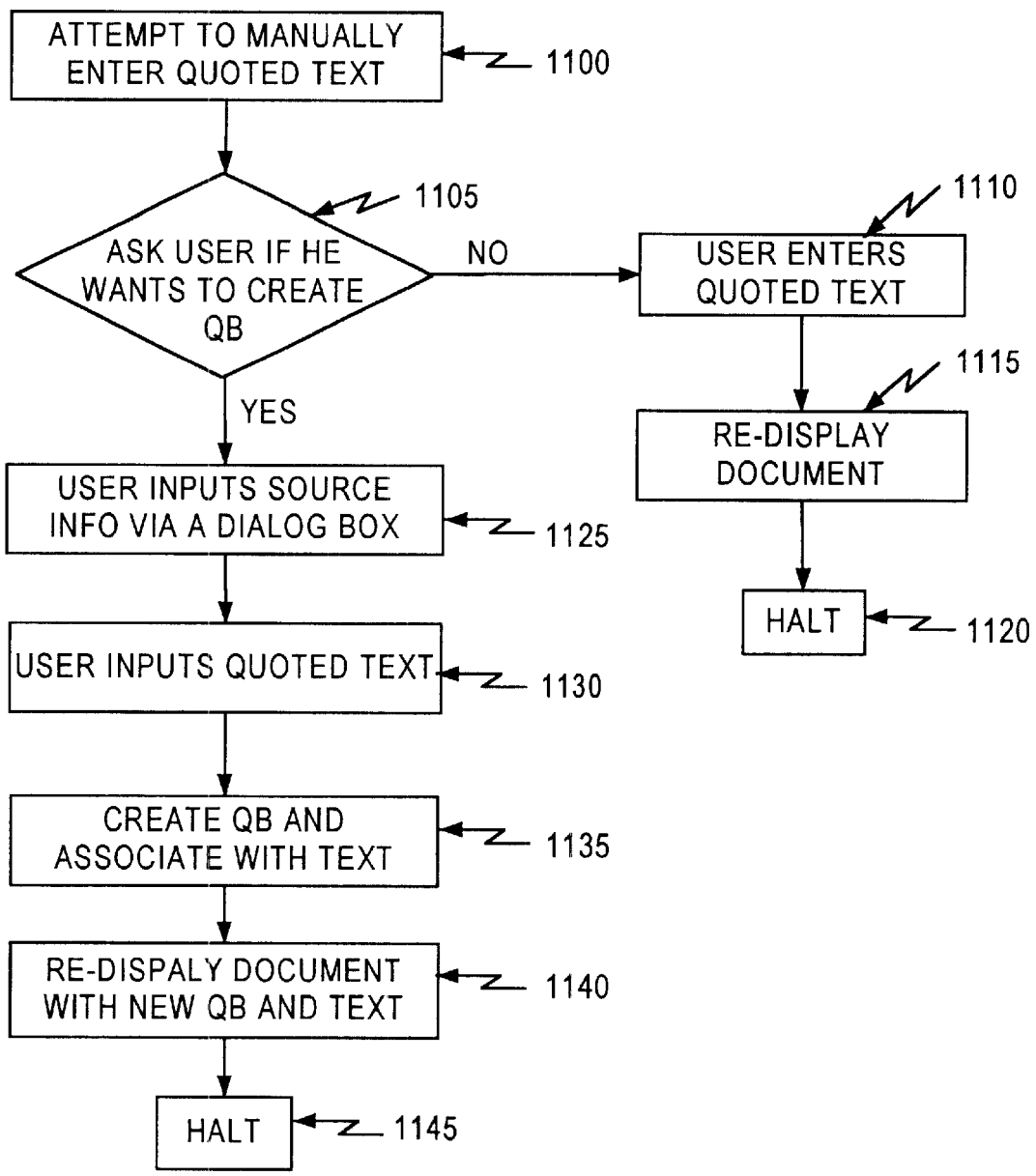
FIG. 11 is a flow chart of a process for manually entering quoted text and the creation of a quote-bar.

FIG. 11 is a flow chart of a process for manually entering quoted text and the creation of a quote-bar. The software has detected that traditionally quoted text has begun to be input into the current document (1100). The user is asked if he wishes to create a quote-bar for the text being input (1105). If he does not wish to create a quote-bar (1105) then the user enters the text using the prior art (1110), the document is re-displayed (1115) and the process is terminated (1120). Alternatively, if the user does wish to create a quote-bar for the text being input (1105), the software display a dialog box in which the user enters the source information and other relevant data (1125), the rest of the quoted text is input (1130), the quote-bar object is created and associated to the input text (1135), the document is then re-displayed with the new quote-bar (1140) and the process is terminated (1150).

Figure 12:
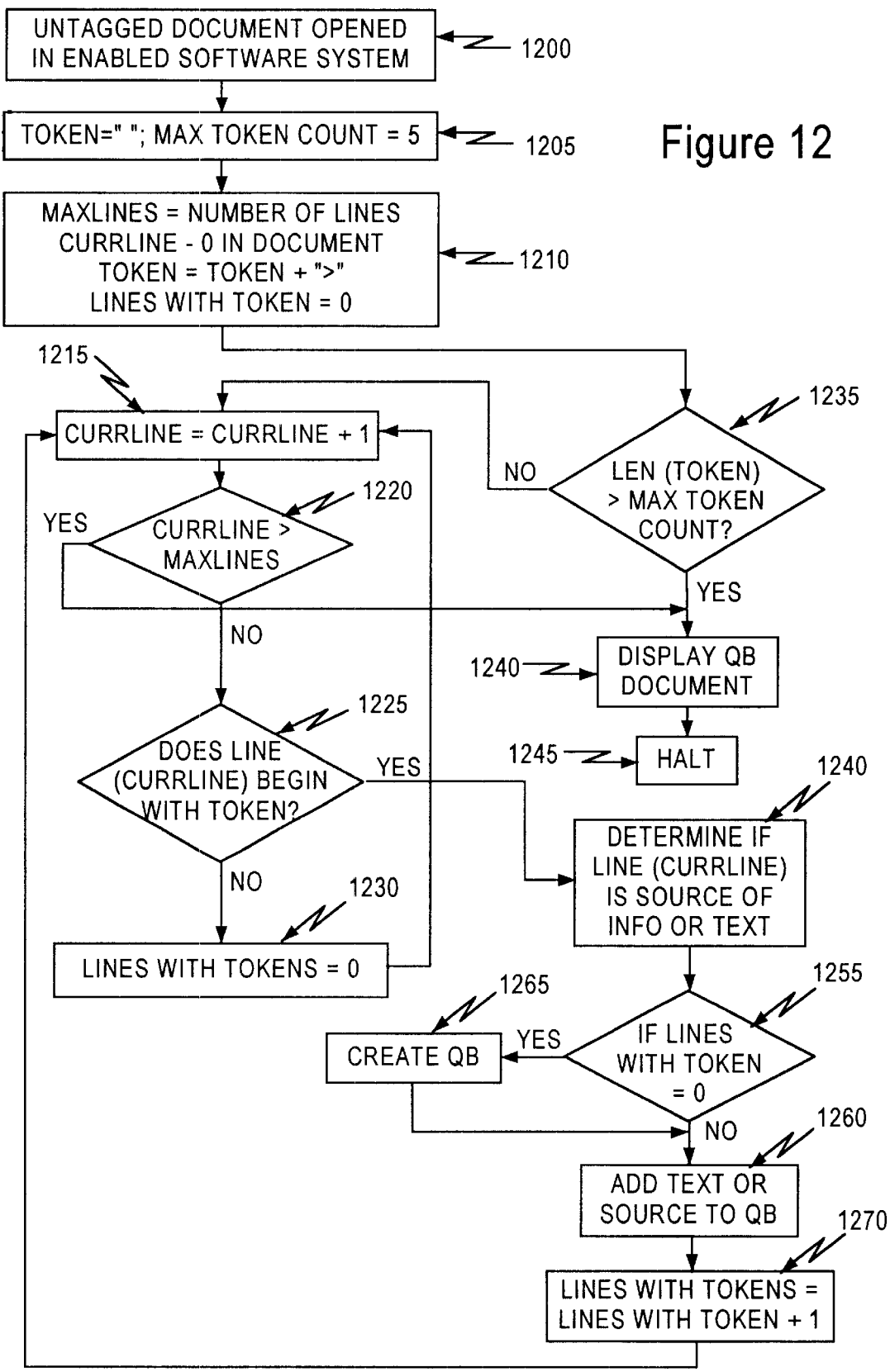
FIG. 12 is a flow chart of a process for converting a quoted text that does not have quote-bars into the present quote-bar system.

FIG. 12 is a flow chart of a process for converting quoted text that does not have quote-bars into the present quote-bar system. A non quote-bar document is opened by the quote-bar enabled software (1200). The variable TOKEN, which will contain ">" symbols in this illustration, is set to null, and the maximum level of quotation variable MAXTOKENCOUNT is (arbitrarily) set to five (1205). The total number of lines in the document is computed and placed in the variable MAXLINES, the variable CURRLINE is set to zero, and the variable TOKEN is concatenated with itself and a ">" symbol (1210). As (1210) is the beginning of a loop, the first test to be made is whether TOKEN contains more ">" symbols than MAXTOKENCOUNT (1235). If it does, the document is displayed with quote-bars (1240) and the process is terminated (1245). If MAXTOKENCOUNT has not been reached (1235) then the variable CURRLINE is increment to point at the next line of text to be processed (1215). If CURRLINE is greater than MAXLINES (1220), indicating that the end of the document has been reached, control is transferred to (1240) where the document is displayed with quote-bars (if any were found) and the process is terminated (1245).

If, however, CURRLINE is less than MAXLINES (1220) then current line of the document pointed to by CURRLINE is examined to determine if it begins with the contents of TOKEN (e.g. ">", ">>", etc.) (1225). If it does, the software begins the quote-bar creation process by determining, using some standard pattern matching algorithm, whether the line contains source information or the quoted text (1250). If the variable LINESWITHTOKENS has a value of zero, indicating that the current line is the first line to begin with the string TOKEN (1255) then the quote-bar is created (1265), the text or source information is added to the quote-bar object (1260), the LINESWITHTOKEN variable is incremented (1270) and the process begins again at (1215).

Figure 13:
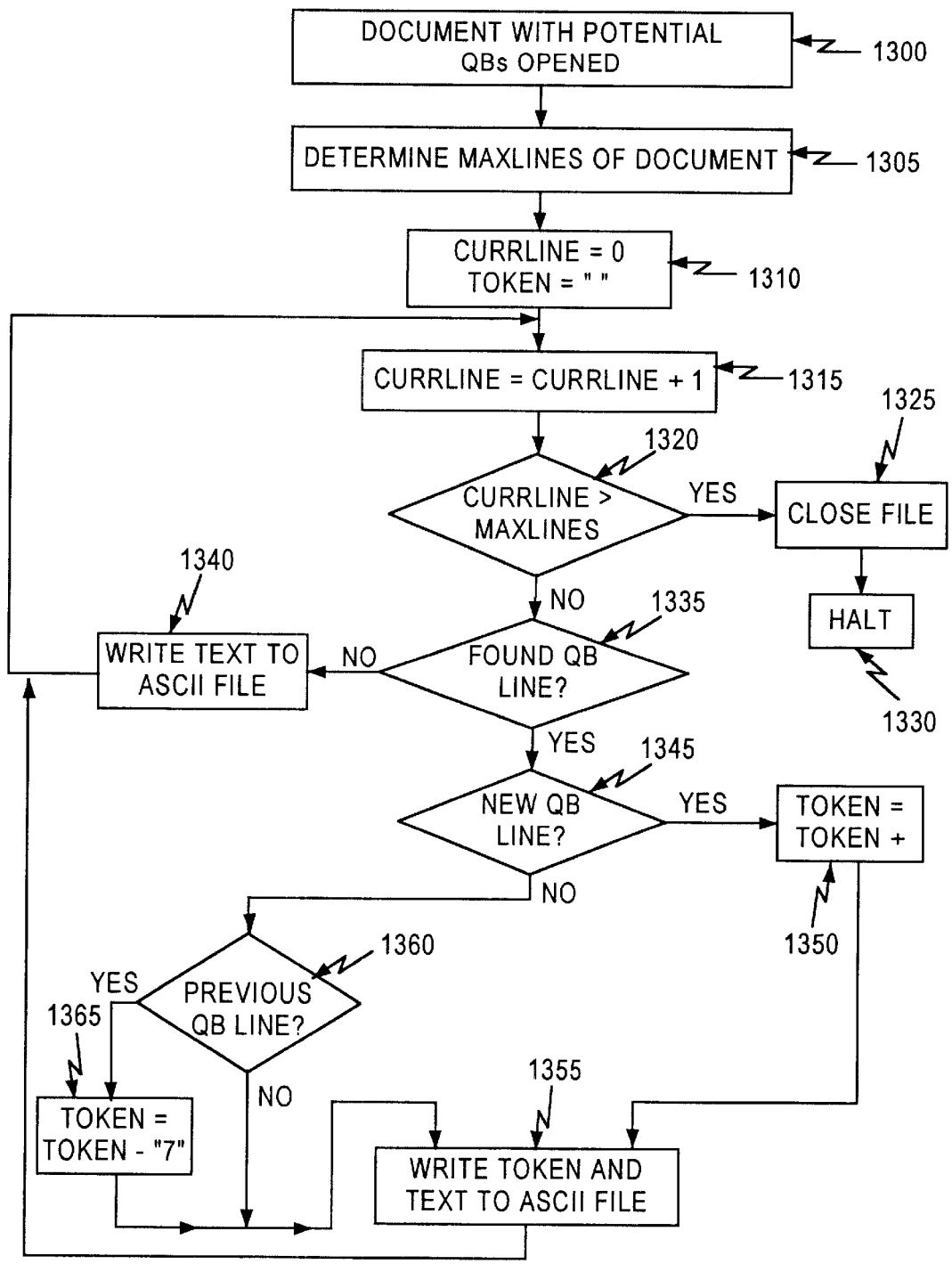
FIG. 13 is a flow chart of a process for converting quote-bar text into ASCII text for transmission to devices that do not support quote-bars.

FIG. 13 is a flow chart of a process for converting quote-bar text into ASCII text for transmission to devices that do not support quote-bars. A quote-bar document is opened in a quote-bar enabled editor (1300). The variable MAXLINES is set to be the total number of lines in the document as it is found in permanent storage (1305), containing the syntax depicted in FIG. 14. The variable CURRLINE is set to zero and the variable TOKEN is set to null (1310). CURRLINE is then increment by one (1315) and compared to MAXLINES (1320). If CURRLINE is greater than MAXLINES (1320) then the process of conversion is complete, the resulting ASCII file is closed (1325) and the process is terminated (1330). Alternatively, if CURRLINE is less than MAXLIINES (1320) then processing continues at (1335). If the current line of text is found not to be a quote-bar line (i.e., the line occurs outside the range of the opening or closing of a quote-bar as defined by the syntax of FIG. 14) (1335) then the text is copied to the ASCII file (1340) and processing resumes at (1315). However, if the current line of text is found to be quote-bar text (1335) and it is the beginning of a new quote-bar (1345) then the variable TOKEN is concatenated with the ">" symbol (1350) and the variable TOKEN and the text are written to the ASCII file (1355) and process begins again at (1315). If however, the text is quote-bar text (1335) but is not the beginning of a new quote-bar (1345) then if the text is one level up in the nesting hierarchy (1360) the variable TOKEN has its right most ">" removed. Regardless of the decision made at (1360) the token and the text are written to the ASCII file (1355) and the process begins again at (1315).

FIG. 14 is an illustration of an implementation of quote-bar syntax that would be used to transfer quote-bar documents from one enabled browser to another. This syntax is based upon HTML syntax, but is provided here only for illustrative purposes. The indicator to quote-bar enabled software that a quote-bar must be created is the keyword "<QUOTE" (1400). Until the keyword "/QUOTE>" is encountered in the text (1418), all of the text in between is considered to be the quote-bar definition. The keyword "/SOURCE" (1404) indicates the following text is to be considered source information. The keyword "<CONTENT" (1406) indicates the actual text to be associated with the quote-bar. The keyword "<NODELETE" (1407) indicates the beginning of text that may not be deleted if the quote-bar is to be retained. The keyword "<BAR_REMOVABLE" (1410) is followed by a boolean value of true or false which indicates whether or not the quote-bar can be removed while the text remains. (1412) demonstrates the nesting of quote-bars, one within another, and may be continued without limit.

FIG. 15 is an illustration of the output of the conversion process from quote-bar text to un-tagged ASCII text. This ASCII text represents a reversion to the prior art for readers and browsers that are not quote-bar enabled. The source and text information contained in this figure is taken from FIG. 14. (1502) indicates the start of the first quote by using the symbol ">". That quote continues through (1504) and then the second quote, indicated by the symbols ">>" begins at (1506). The second quote continues through (1508).

Figure 16A:
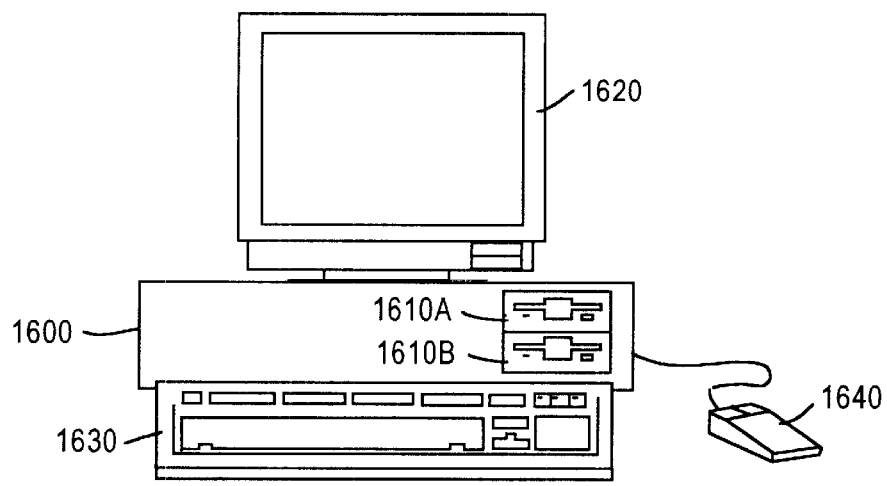
FIG. 16A illustrates a computer of a type suitable for carrying out the invention.

FIG. 16A illustrates a computer of a type suitable for carrying out the invention. Viewed externally in FIG. 16A, a computer system has a central processing unit 1600 having disk drives 1610A and 1610B. Disk drive indications 1610A and 1610B are merely symbolic of a number of disk drives which might be accommodated by the computer system. Typically, these would include a floppy disk drive such as 1610A, a hard disk drive (not shown externally) and a CD ROM drive indicated by slot 1610B. The number and type of drives varies, typically, with different computer configurations. The computer has the display 1620 upon which information is displayed. A keyboard 1630 and a mouse 1640 are typically also available as input devices. Preferably, the computer illustrated in FIG. 16A is a SPARC workstation from Sun Microsystems, Inc.

Figure 16B:
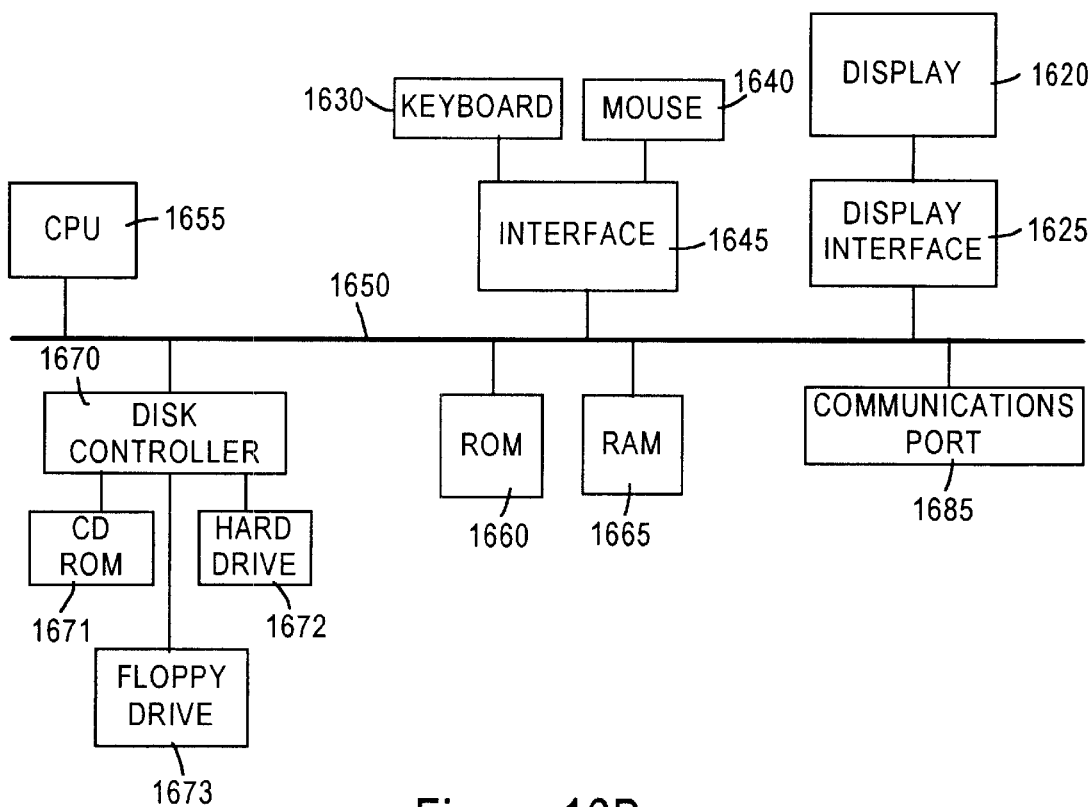
FIG. 16B illustrates a block diagram of the computer of FIG. 16A.

FIG. 16B illustrates a block diagram of the internal hardware of the computer of FIG. 16A. A bus 1650 serves as the main information highway interconnecting the other components of the computer. CPU 1655 is the central processing unit of the system, performing calculations and logic operations required to execute programs. Read only memory (1660) and random access memory (1665) constitute the main memory of the computer. Disk controller 1670 interfaces one or more disk drives to the system bus 1650. These disk drives may be floppy disk drives, such as 1673, internal or external hard drives, such as 1672, or CD ROM or DVD (Digital Video Disks) drives such as 1671. A display interface 1675 interfaces a display 1620 and permits information from the bus to be viewed on the display. Communications with external devices can occur over communications port 1685.

Figure 16C:
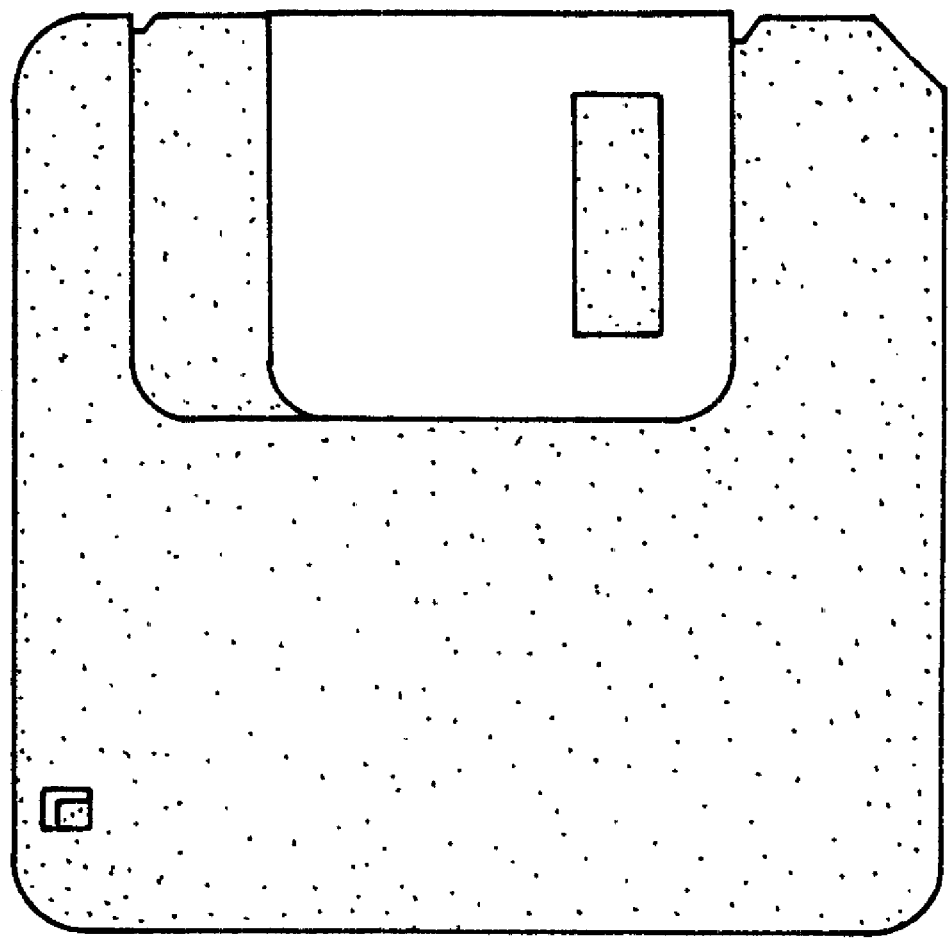
FIG. 16C illustrates an exemplary memory medium containing one or more programs usable with the computer of FIG. 16A.

FIG. 16C illustrates an exemplary memory medium which can be used with drives such as 1673 in FIG. 16B or 1610A in FIG. 16A. Typically, memory media such as a floppy disk, or a CD ROM, or a Digital Video Disk will contain the program information for controlling the computer to enable the computer to perform its functions in accordance with the invention.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for displaying text information comprising:
   a. a display;
   b. a keyboard; and
   c. a computer, connected to said keyboard and said display, configured to display quoted or derived text material as an object including a quote bar.

2. Apparatus of claim 1 in which said computer is configured as a browser.

3. Apparatus of claim 1 in which said computer is configured as a text editor.

4. Apparatus of claim 1 in which said computer is configured as an e-mail editor.

5. Apparatus of claim 1 further including a mouse connected to said computer, and in which said quote bar displays information about a source of said quoted or derived text material.

6. Apparatus of claim 5 in which said quoted or derived text material can be repositioned using said mouse to drag and drop said quote bar to a different location.

7. Apparatus of claim 5 in which information about said quoted or derived text material can be displayed using said mouse to click on said quote bar.

8. Apparatus of claim 6 in which said information about said quoted or derived text material is information about origin of the text material.

9. Apparatus of claim 6 in which said information about said quoted or derived text material is a network address where said text material originated.

10. Apparatus of claim 6 in which said information about said quoted or derived text material is copyright information.

11. A method of displaying information about a source of quoted or derived text material comprising steps of:
    a. providing an element for performing a step of associating said text material with a quote bar; and
    b. providing an element for performing a step of associating said information about a source with said quote bar so that when said quote bar is selected, said information about said source is displayed.

12. The method of claim 11 in which said information is information about origin of the text material.

13. The method of claim 11 in which said information is a network address where said text material originated.

14. The method of claim 11 in which said information is copyright information.

15. The method of claim 14 in which separation of said copyright information from said text material is prevented.

16. A system for communicating textual information, comprising:
    a. a network; and
    b. a plurality of computers connected to said network;
    c, at least one of said computers is configured to group quoted or derived information together with a quote bar.

17. A computer program product comprising:
    a. a memory medium; and
    b. a computer program stored on said medium, said computer program comprising instructions for associating text material with a quote bar and associating information about a source with said quote bar so that when said quote bar is selected, said information about said source is displayed.

* * * * *

UNITED STATES PATENT AND TRADEMARK OFFICE
CERTIFICATE OF CORRECTION

PATENT NO. : 6,496,841 B1
DATED : December 17, 2002
INVENTOR(S) : Bruce Tognazzini It is certified that error appears in the above-identified patent and that said Letters Patent is hereby corrected as shown below:

<u>Title page,</u>
Item [73], Assignee, please replace "Mountain View" with -- Santa Clara --.

Signed and Sealed this

Eleventh Day of November, 2003

JAMES E. ROGAN
*Director of the United States Patent and Trademark Office*